United States Patent [19]
Gardner

[15] 3,704,574
[45] Dec. 5, 1972

[54] COMBINE AUTOMATIC HEADER HEIGHT CONTROL
[72] Inventor: Frank H. Gardner, Colona, Ill.
[73] Assignee: Internatioanl Harvester Company, Chicago, Ill.
[22] Filed: Oct. 4, 1971
[21] Appl. No.: 186,133

[52] U.S. Cl. .................................. 56/10.2, 56/208
[51] Int. Cl. ............................................ A01d 45/18
[58] Field of Search ........ 56/10.2, 10.4, 208, DIG. 15

[56] References Cited

UNITED STATES PATENTS 3,088,264  5/1963  Sallee ............................... 56/208 X
3,402,540  9/1968  Karlsson et al. ....................... 56/208

Primary Examiner—Louis G. Mancene
Assistant Examiner—J. N. Eskovitz
Attorney—Floyd B. Harman

[57] ABSTRACT

An automatic header control for a harvester platform that conveys the sensed ground contour to the valve without distortion and can be adjusted for various heights without introducing distortions. A bar that is oscillated by the ground sensing fingers has a chain that warps and unwraps around the bar. The chain is connected through a flexible cable to a control arm that engages the control valve stem. The control valve is pivotally adjustable about the arm axis to thus provide height adjustment without distortion.

6 Claims, 3 Drawing Figures

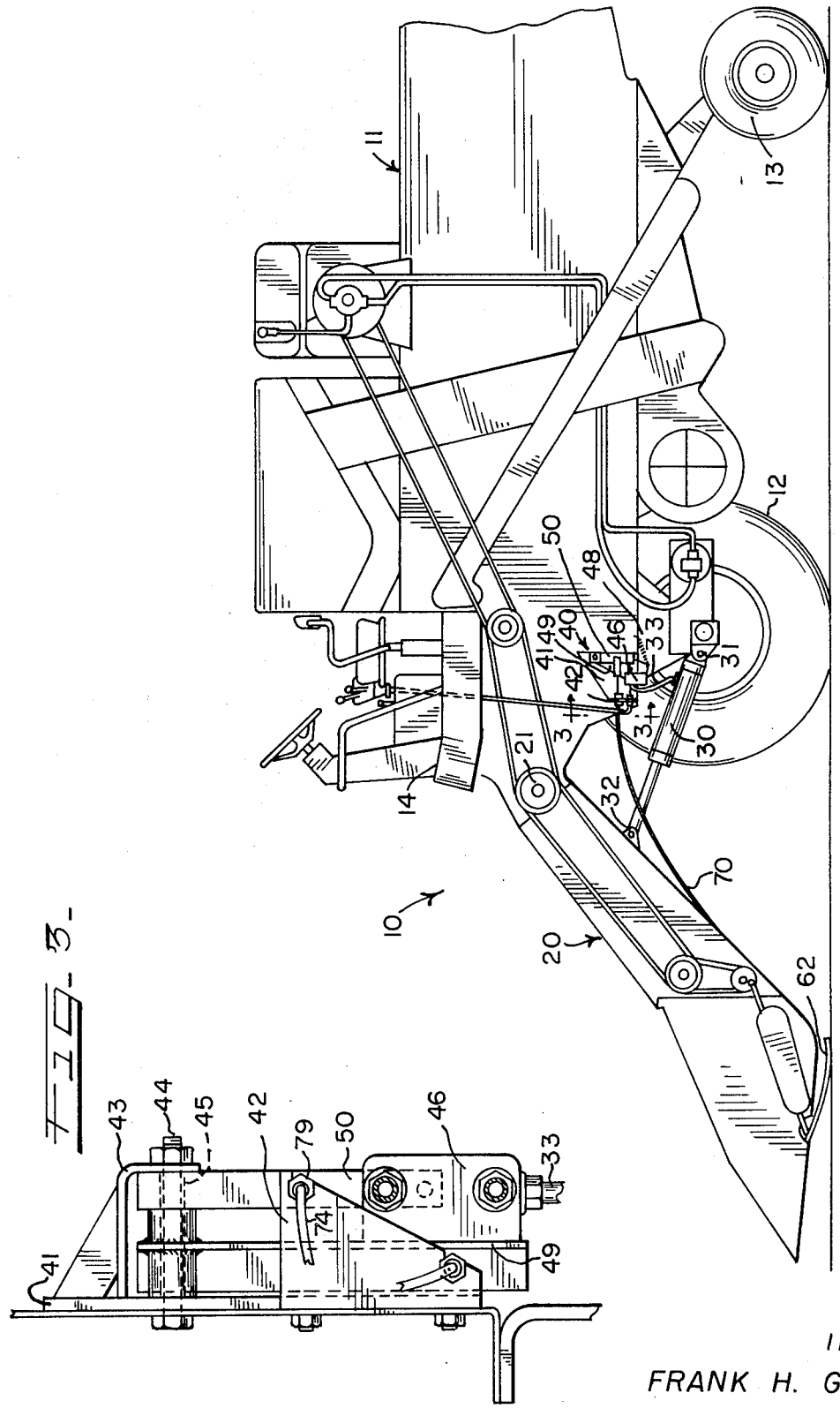

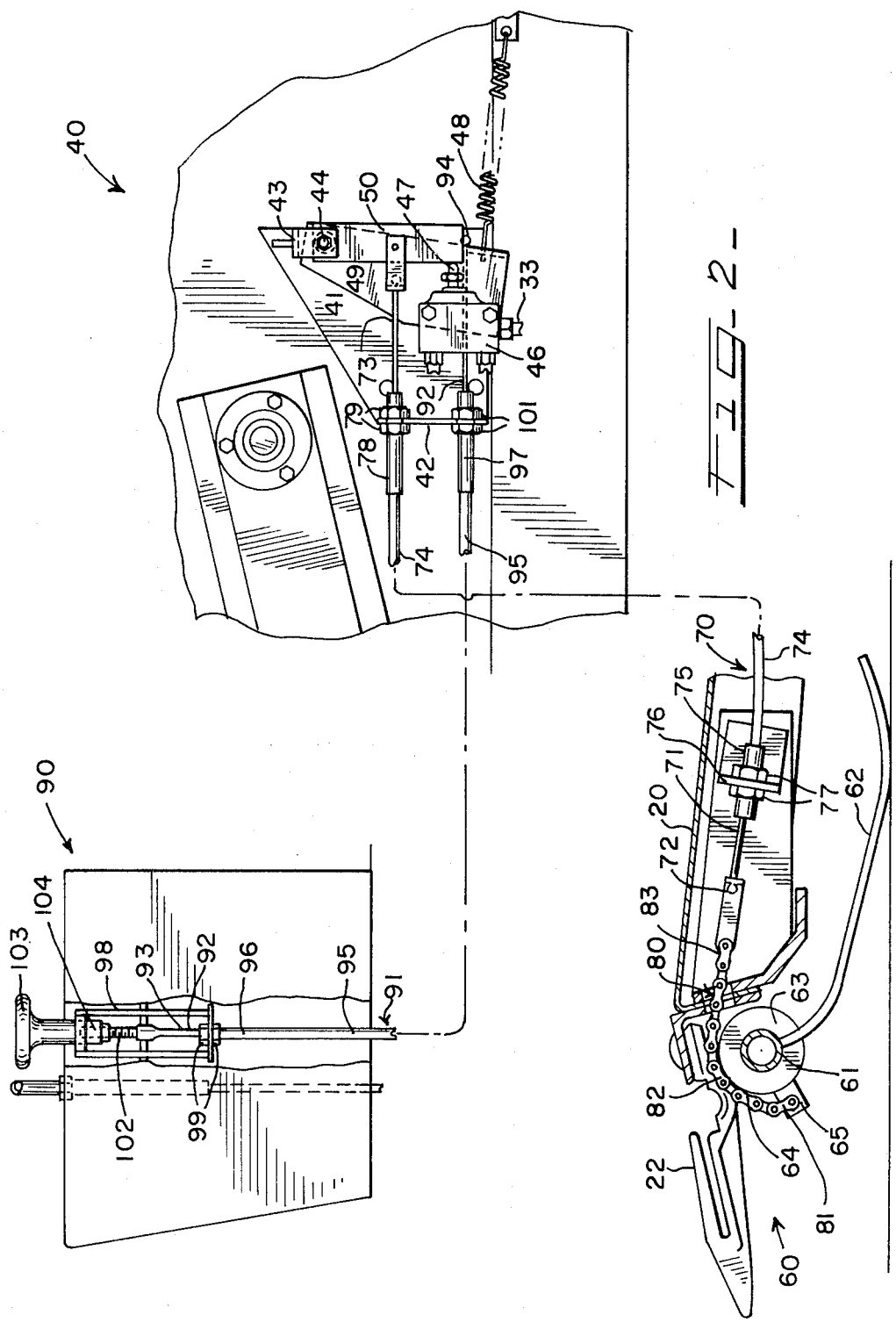

COMBINE AUTOMATIC HEADER HEIGHT CONTROL

BACKGROUND OF THE INVENTION

1. Field of the Invention

The present invention relates generally to agricultural machines and more particularly to a device for maintaining the crop treating portion of an agricultural machine at a predetermined height above the ground.

2. Description of the Prior Art

In some agricultural machines, it is important that the header closely follow the contour of the ground and with the increase in size of today's machines and the speed at which they traverse the ground, it has become necessary to provide power means to automatically raise and lower the header. A device for doing this is shown in the patent to Wright U.S. Pat. No. 2,750,727.

One of the problems in the available automatic header controls is that there is a distortion in the transmitting means between the ground-engaging fingers and the control valve. In the prior art devices such as that disclosed in the above-referred to Wright patent, the ground-engaging fingers are pivoted at one end and oscillate about this pivot in response to changes in the ground contour. A lever arm projects radially from the pivot axis of the ground-engaging finger and means are connected between the end of this lever arm and the control valve. In this system, one component of the rotary motion is transmitted from the sensing finger to the control valve. This can be adjusted so that it is most accurate in the center of the range, but looses accuracy as it moves towards either end of the range. In the prior art devices, another distortion is introduced in attempting to adjust the height at which the header will operate. In the prior art devices this is accomplished by lengthening or shortening the means connecting the control valve to the ground-engaging finger lever arm. This rotates the neutral position for the lever that engages the control valve and thus changes its angle relative to the control valve so that the magnitude of the component of movement transmitted has been changed.

SUMMARY

In an effort to overcome the above mentioned prior art problems, the present invention contemplates wrapping a flexible member around a cylinder concentric with the pivot axis of the sensing finger so that the flexible member is wrapped and unwrapped in response to oscillation of the sensing finger. In this arrangement we sense not just a component of the movement, but the entire movement and thus, there is no distortion at the outer limits of the sensing range. In the experimental work it was found that repititous wrapping and unwrapping of a flexible wire eventually result in failure of the wire due to fatigue. Thus, in the present invention, a link chain has been used to overcome this difficulty. In an effort to eliminate the distortion incident to adjusting the height at which the automatic header control will operate, the present invention contemplates pivotally mounting the control valve about the same axis at which the control arm that engages the control valve stem is mounted. The position of the control valve is controlled through a screw device convenient to the operator of his platform. Through this arrangement, upon re-adjusting for a different height, only the magnitude of the angular relationship between the control valve and the control arm for engaging the control valve is changed. Thus, when the control arm engages the control valve stem, the same component of movement is transmitted regardless of the adjustment.

An object of the present invention is to provide an automatic header control that will sense the contour of the ground and transmit this information without distortion to the control valve that functions to raise and lower the header.

Another object of the present invention is to permit adjustment for various heights without introducing distortions in the information transmitted from the ground sensing fingers to the control valve.

BRIEF DESCRIPTION OF THE DRAWINGS

FIG. 1 shows a side elevation view of an agricultural machine such as a combine incorporating the present invention;

FIG. 2 is a fragmentary sketch of three components of the present invention that are connected by flexible cables; and FIG. 3 is an enlarged view of the control valve taken along lines 3—3 of FIG. 1.

DESCRIPTION OF THE PREFERRED EMBODIMENT

Referring now to the drawings wherein like reference characters designate like or corresponding parts throughout the several views there is shown in FIG. 1 an agricultural machine designated 10 comprising a wheeled vehicle such as a combine 11 and a pivotally mounted platform or header 20. The combine 11 includes drive wheels 12, steerable wheels 13 and an operator's platform 14. The platform or header 20 is connected to the combine 11 at a pivot mounting 21. A hydraulic cylinder means 30 is connected to the combine by a pivot mounting 31 and to the platform by a pivot mounting 32. The hydraulic cylinder means 30 communicates with hydraulic control valve 46 through a conduit 33. Upon expansion or contraction of the hydraulic cylinder means 30, the platform or header 20 is raised or lowered respectively about the pivot mounting 21. The control valve 46 can be of a standard design. Reference can be made to the patent to Sallee U.S. Pat. No. 3,088,264 for a disclosure of a valve that could be used for this purpose. The control valve 46 is connected to the combine hydraulic system and by actuating a manual control lever, the operator can cause the hydraulic cylinder means 30 to expand or contract to thus raise or lower the header 20. The manual control for raising and lowering the header is standard and is not part of the subject invention. Reference may be had to the above-referred to Sallee patent for a disclosure of this standard feature.

The subject invention concerns a means for automatically raising and lowering the header 20 in response to changes in the contour of the terrain. A control means designated 40 is provided to sense the changes in contour of the terrain, transmit this information without distortion to the hydraulic control valve 46 which controls fluid flow to and from the hydraulic cylinder means 30 which functions to raise and lower the header.

A base mounting plate 41 is secured to the side wall of the combine as seen in FIG. 1. As best seen in FIGS. 2 and 3, the base plate 41 has a flange 42 protruding therefrom. The base plate 41 also includes a support assembly 43 that supports one end of a pivot rod 44, the other end of which is supported by the base plate. As shown in broken lines in FIG. 3, a spacer tube 45 is carried by the pivot rod 44 and a valve plate 49 and control arm 50 are pivotally supported on the spacer tube 45. The hydraulic control valve 46 is secured to the valve plate 49 and is free to pivot with the valve plate 49. As best seen in FIG. 2 a spring 48 is connected at one end to the lower edge of valve plate 49 and is fixed at its other end to the combine side wall. Spring 48 biases the valve plate in a counterclockwise direction about the spacer tube 49 as seen in FIG. 2.

At the leading edge of the platform or header 20 there is a transversely extending sickle 22 below which is mounted the sensing means 60. The sensing means 60 includes a transversely extending rockshaft 61 having a plurality of ground-engaging feelers or fingers 62 secured thereto and extending downwardly and rearwardly therefrom. The ground-engaging feeler 62 ride on the ground and oscillate the transversely extending rockshaft 61 in response to changes in the terrain. The cam member 63 having an outer cylindrical engaging surface 64 and a radial protruding mounting arm 65 is secured to the transversely extending rockshaft 61 and oscillates therewith.

A first flexible control cable designated 70 extends between the mounting arm 65 and the pivoted control arm 50. (See FIG. 2) The first end 75 of outer cable 74 is secured by nuts 77 to a mounting plate 76 that is fixed to the underside of the platform or header 20. The second end 78 of outer cable 74 is secured by nuts 79 to the flange 42 of the base mounting plate 41. The first flexible control cable 70 includes an inner cable 71 which extends through the outer cable 74 and is movable relative thereto. A link chain 80 is secured at one end 81 to the mounting arm 65 of the cam member 63. The intermediate portion 82 of the link chain engages the cylindrical engaging surface 64 of the cam member 63. The other end 83 of link chain 80 is connected to the first end 72 of the inner cable 71. The other end 73 of the inner cable 71 is connected to the control arm 50.

A height control means 90 is provided so that the operator can select and adjust the spacing between the terrain and the platform 20 that the automatic platform control will seek to maintain. The height control means 90 includes a second flexible control cable 91 made up of a second outer tubular cable 95 and a second inner cable 92. The first end 96 of the second outer tubular cable 95 is secured to a mounting bracket 98 by nuts 99 on the combine operator's platform 14. The second end 97 of the second outer tubular cable 95 is secured by nuts 101 to the flange 42 of the base mounting plate 41. The first end 93 of the second inner cable 92 includes a threaded male section 102. A knob 103 is pivotally supported by the mounting bracket 98 and includes a threaded female section 104 that matches the male threaded section 102. The operator can, by turning knob 103, cause axial movement of the second inner cable 92. The second end 94 of the second inner cable 92 is connected to the valve plate 49. When the operator turns knob 103, he can thus pivot value plate 49 about the spacer tube 45. It should be noted that spring 48 biases the valve plate 49 in a counterclockwise direction as seen in FIG. 2 and that to pivot the valve plate 49 in a clockwise direction, the tension in spring 48 must be overcome by the second flexible control cable 91.

It should be noted that by mounting the valve plate 49 and control arm 50 about the same pivot axis, the relationship between the control arm 50 and the reciprocating metering stem 47 of the hydraulic control valve 46 is not disturbed by adjustment in the height control means 90. For example, when the reciprocating metering stem 47 is fully extended and the control arm 50 is engaging the free end of reciprocating metering stem 47, an increment of movement of the first flexible control cable 70 will have the same effect on the hydraulic control valve 46 regardless of the adjustment of the height control means 90. This is one of applicant's improvements over the prior art devices and is thus considered an important aspect of the subject invention.

OPERATION

In operation, the control for the hydraulic cylinder means 30 is moved to the automatic header control position. As the combine proceeds down the field, the ground-engaging feelers 62 are in contact with the terrain and in response to elevations and depressions in the terrain, they cause an oscillation of the transversely extending rockshaft 61. As the rockshaft 61 oscillates, the link chain 80 wraps and unwraps about the cylindrical engaging surface 64 of the cam member 63. Wrapping and unwrapping of link chain 80 about the cam member 63 causes an axial movement of the first inner cable 71 and thus a pivotable movement of the control arm 50 about spacer tube 45. The free end of control arm 50 engages the end of reciprocating metering stem 47 and pivotable movement of the control arm 50 causes reciprocal movement of the metering stem 47. As the reciprocating metering stem 47 moves relative to the hydraulic control valve 46, the flow of hydraulic fluid through the fluid conduit 33 to and from the hydraulic cylinder means 30 is affected in such a way that the platform or header 20 is raised in response to an increase in elevation of the terrain and is lowered in response to the depression in the terrain. Thus, through the automatic header control, the platform or header 20 is maintained at a selected height over the terrain. If it is desired to change the selected spacing between the platform or header 20 and the terrain, then the operator merely turns the knob 103 which causes the hydraulic control valve 46 to pivot about the spacer tube 45 and this will change the height above the terrain that the platform will seek. For example, if the hydraulic control valve 46 is pivoted in the clockwise direction, as seen in FIG. 2, through manipulation of the knob 103, it will cause the platform or header 20 to seek a lower level then it had previously sought. Likewise if the hydraulic control valve 46 is pivoted about the spacer tube 45 in the counterclockwise direction as seen in FIG. 2 through manipulation of the knob 103, it will cause the platform or header 20 to seek a higher elevation over the terrain than it had previously sought.

What is claimed is:

1. In an agricultural machine including a wheeled vehicle and a pivotally mounted platform,
   hydraulic cylinder means connected between said wheeled vehicle and said platform for raising and lowering the latter relative to the ground,
   control means connected to said hydraulic cylinder means for maintaining said harvester platform at a selective relationship relative to the ground comprising:
   a hydraulic control valve connected to said hydraulic cylinder, said control valve having a reciprocating metering stem,
   a transversely extending rockshaft carried by said harvester platform, a ground-engaging feeler secured to said rockshaft,
   a member having a cylindrical engaging surface secured to said rockshaft,
   a mounting arm protruding from said cylindrical engaging surface,
   a flexible control cable including an inner cable slidable within an outer tubular cable, said outer tubular cable fixed at a first end to said harvester platform adjacent said cylindrical engaging surface,
   a link chain connected at one end to said mounting arm and at its other end to a first end of said inner cable, the intermediate portion of said link chain engaging said cylindrical engaging surface such that when said rockshaft is oscillated the link chain wraps and unwraps upon said cylindrical engaging surface causing movement of the inner cable relative to the outer tubular cable,
   the other end of said inner cable being associated with said metering stem and operative to cause reciprocation of the metering stem relative to the control valve.

2. The invention as set forth in claim 1, wherein when said metering stem is slid into said control valve the hydraulic cylinder is expanded and the platform is raised and when slid out the hydraulic cylinder contracts and the platform is lowered,
   said control valve being pivotally mounted on said wheeled vehicle, height control means accessible to the operator for repositioning said control valve about its pivot mounting,
   a lever pivotally mounted at one end to said wheeled vehicle about the pivot mounting of said control valve, the free end of said lever being in contact with said metering stem, said other end of the inner cable connected to said lever.

3. The invention as set forth in claim 2, wherein said control valve is spring biased in a first direction about its pivot mounting and said height control means includes a second flexible control cable having a second inner cable slidable within a second outer tubular cable,
   a first end of said second outer tubular cable fixed to said wheeled vehicle adjacent said control valve,
   a first end of said second inner cable connected to said control valve,
   the second end of said second inner control cable located such that it is accessible to the operator,
   operator actuated means for sliding said second inner cable relative to said second outer cable to thereby pivot said control valve about said pivot mounting in opposition to the force of said spring.

4. An agricultural machine including a wheeled vehicle and a pivotally mounted platform,
   hydraulic cylinder means connected between said wheeled vehicle and said platform for raising and lowering the latter relative to the ground,
   sensing means carried by said platform for sensing the ground below the platform,
   control means connected to said hydraulic cylinder means for maintaining said harvester platform at a selective relationship relative to the ground comprising:
   a hydraulic control valve pivotally mounted on said wheeled vehicle and operatively connected to said hydraulic cylinder, said control valve having a reciprocating metering stem that when slid into the control valve causes the hydraulic cylinder to expand and the platform to raise and when slid out causes contraction of the hydraulic cylinder and lowering of the platform,
   a first flexible control cable including an inner cable slidable within an outer tubular cable, said outer tubular cable fixed at a first end to said harvester platform adjacent said sensing means, a first end of said inner cable connected to said sensing means,
   a lever pivotally mounted at one end to said wheeled vehicle about the pivot mounting of said control valve, the free end of said lever being in contact with said metering stem,
   the other end of said first inner cable connected to said lever whereby the response of said sensing means is transmitted to said control valve and said platform is raised or lowered accordingly,
   height control means accessible to the operator for repositioning the control valve relative to the wheeled vehicle about its pivot mounting to thus change the selective relationship between the platform and the ground.

5. The invention as set forth in claim 4, wherein said height control means includes,
   a second flexible control cable having a second inner cable slidable within a second outer tubular cable,
   a first end of said outer tubular cable fixed to said wheeled vehicle adjacent said control valve,
   a first end of said second inner cable connected to said control valve,
   the second end of said second inner cable located such that it is accessible to the operator, operator actuated means for sliding said second inner relative to said second outer cable the thereby pivot said control valve about its pivot mounting.

6. The invention as set forth in claim 5, wherein said control valve is spring biased to rotate about is pivot mounting in opposition to the pulling of said height control means.

* * * * *